United States Patent
Studer et al.

(10) Patent No.: US 10,143,191 B2
(45) Date of Patent: Dec. 4, 2018

(54) INSECT LIGHT TRAP WITH LIGHT TRANSMISSIVE GLUE BOARD

(71) Applicant: GARDNER MANUFACTURING CO., INC., Horicon, WI (US)

(72) Inventors: Bruce R. Studer, Germantown, WI (US); Timothy M. Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 240 days.

(21) Appl. No.: 15/132,558

(22) Filed: Apr. 19, 2016

(65) Prior Publication Data

US 2017/0295771 A1   Oct. 19, 2017

(51) Int. Cl.
| | |
|---|---|
| *A01M 1/14* | (2006.01) |
| *A01M 1/04* | (2006.01) |
| *A01M 1/10* | (2006.01) |
| *F21V 23/06* | (2006.01) |
| *F21Y 101/02* | (2006.01) |

(52) U.S. Cl.
CPC .............. *A01M 1/145* (2013.01); *A01M 1/04* (2013.01); *A01M 1/106* (2013.01); *F21V 23/06* (2013.01); *F21Y 2101/02* (2013.01)

(58) Field of Classification Search
CPC .......... A01M 1/02; A01M 1/04; A01M 1/106; A01M 1/14; A01M 1/145
USPC .................................. 43/107, 113, 114, 115
See application file for complete search history.

(56) References Cited

U.S. PATENT DOCUMENTS

| | | | | |
|---|---|---|---|---|
| 550,345 | A * | 11/1895 | Humphreys | 43/113 |
| 3,023,539 | A * | 3/1962 | Emerson, Jr. | A01M 1/145 43/113 |
| 4,117,624 | A * | 10/1978 | Phillips | A01M 1/145 43/113 |
| 5,425,197 | A * | 6/1995 | Smith | A01M 1/04 43/113 |
| 6,393,759 | B1 * | 5/2002 | Brown | A01M 1/023 43/113 |
| 6,886,292 | B2 * | 5/2005 | Studer | A01M 1/026 43/112 |
| 2003/0079398 | A1 * | 5/2003 | Holmes | A01M 1/145 43/113 |
| 2004/0016173 | A1 * | 1/2004 | Tully | A01M 1/145 43/114 |
| 2010/0263260 | A1 * | 10/2010 | Engelbrecht | A01M 1/02 43/113 |
| 2014/0223803 | A1 * | 8/2014 | Hariyama | A01M 1/04 43/107 |

(Continued)

FOREIGN PATENT DOCUMENTS

EP    3162202 A1 *   5/2017    ............ A01M 1/145

*Primary Examiner* — Lisa L Tsang
(74) *Attorney, Agent, or Firm* — Thomas J. Nikolai; Nikolai & Mersereau, P.A.

(57) ABSTRACT

Insect capture is improved by providing a glue board having an adhesive coating on its front surface and forming a pattern of insect attractant. UV light on that front surface. That pattern includes areas of bright UV light generated by light-emitting diodes behind and visible through the glue board by flying insect, dimmer areas of UV light that bounces off other portions of the device onto the glue board, and areas of shadow on the glue board where no or little UV light is present.

16 Claims, 4 Drawing Sheets

(56) References Cited

U.S. PATENT DOCUMENTS

2016/0000060 A1* 1/2016 Sandford ................ A01M 1/02
43/113

* cited by examiner

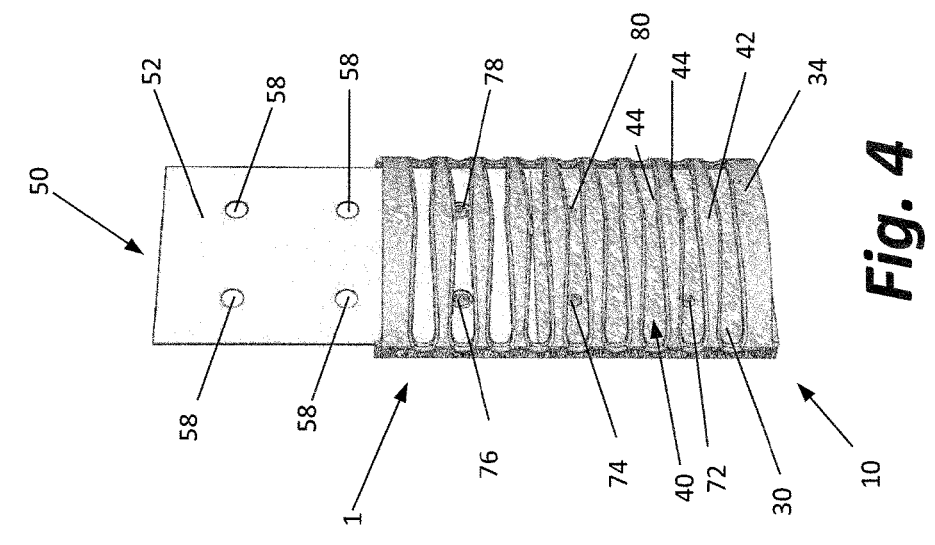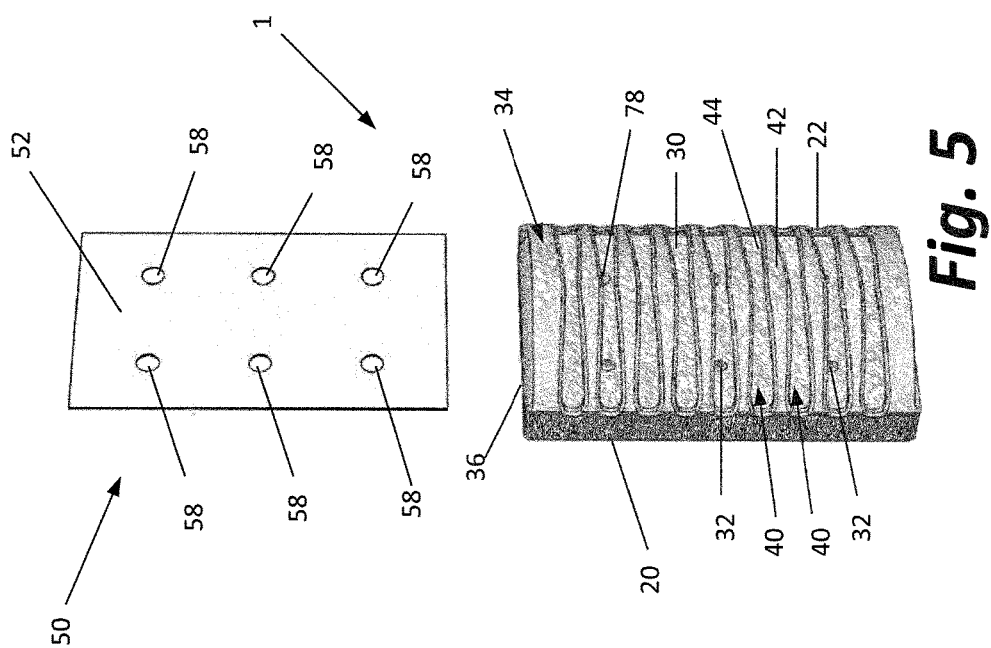

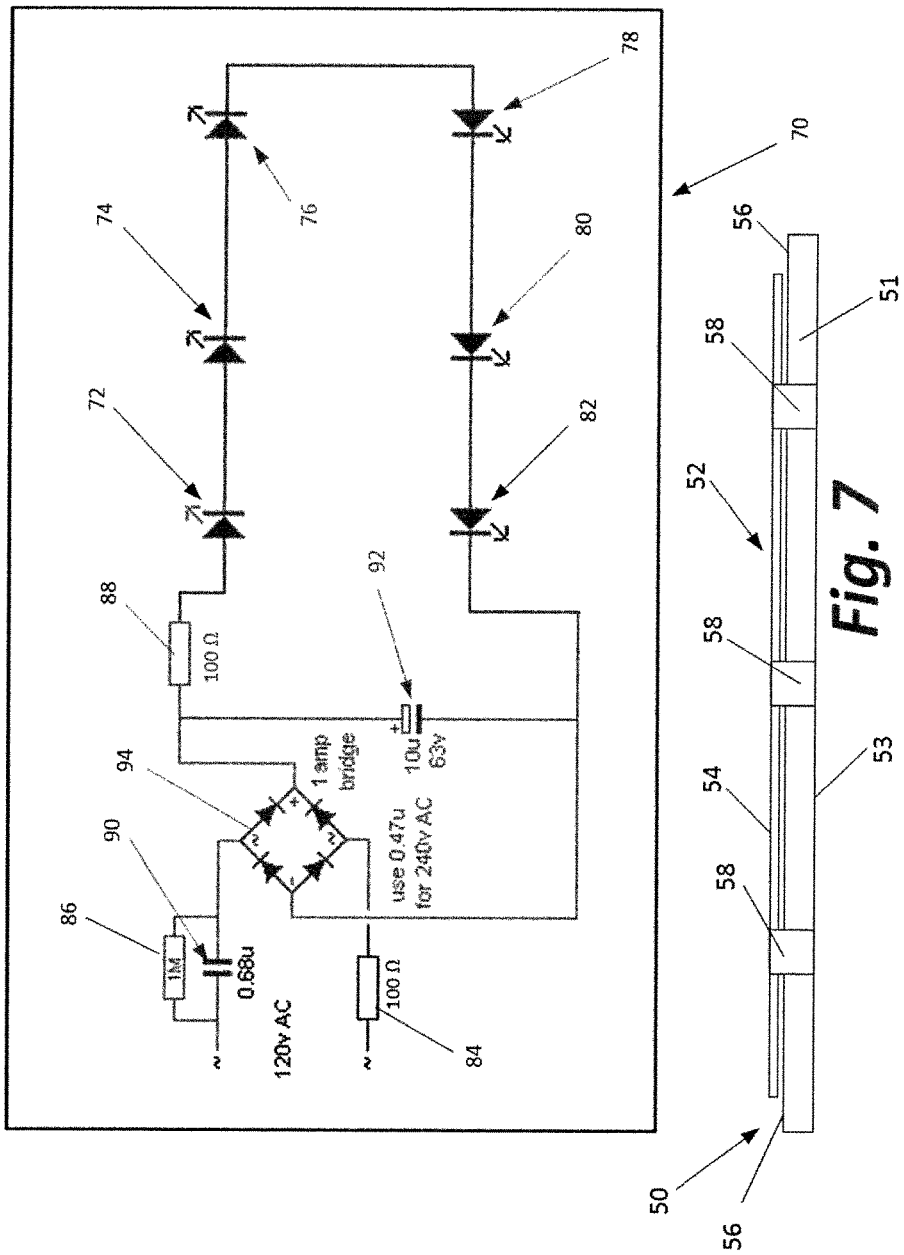

INSECT LIGHT TRAP WITH LIGHT TRANSMISSIVE GLUE BOARD

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates generally to insect traps. More specifically, the present invention relates to improvements to insect traps employing a light source as an insect attractant and a glue board as an insect capture device.

II. Discussion of Related Art

Those skilled in the art know that light provides an effective insect attractant and that light in the ultraviolet ("UV") range of the light spectrum is particularly attractive to many flying insects. UV light is light having a wave length generally in the range of 100 to 400 nanometers.

Based on this phenomena, designers of insect light traps have often employed fluorescent tubes incorporating phosphor that predominantly emits UV light instead of white light visible to humans. One advantage of such fluorescent UV tubes is that they can be "tuned" to give off peak light in very narrow UV ranges based upon the phosphor selected. For example, europium-doped strontium fluoroborate phosphor will produce a peak emission of light in the 368 to 371 nanometer range while lead-doped barium silicate phosphor will produce a peak emission of light in the 350 to 353 nanometer range. However, energy consumption by such light sources and disposal of such light sources create environmental issues. Health concerns can also arise if the fluorescent tube breaks and its contents are inhaled or ingested.

Those skilled in the art also know that an insect trap must not only lure the insects to the trap, but must also either capture or kill the insects that are lured to the trap. Four basic methods are used. First, electrical grids that electrocute the insects coming into contact with the grid have been used. These, however, are entirely unsuitable for restaurants and other areas where food is prepared or served due to splatter of bug parts. Second, various poisons have been employed, but the use of a poison is unacceptable where young children are present who might ingest the poison. Third, various mechanisms have been employed to move the insects into chambers from which the insect cannot escape. For flying insects, this technique typically involves the use of fans that create an airflow or current drawing the insects into a chamber and then preventing the insects from escaping. Fourth, adhesive surfaces such as those of glue boards have been used. Glue boards are generally safe, but a glue board coated with flying insects is generally unsightly and unpleasant to look at. Also, if the light source is any distance from the glue board, insects attracted to the light source may never come into contact with the glue board and, thus, may fly away without being captured.

In view of the foregoing, there is a real need for improvements in flying insect trap design, both in terms of insect attraction and capture.

SUMMARY OF THE INVENTION

The present invention relates to insect traps including a light source, a glue board and a housing. The light source comprises an electronic circuit including a plurality of spaced apart light-emitting diodes adapted to emit light in the ultraviolet range of the light spectrum. The glue board includes a substrate having front and back sides and an adhesive layer coating a selected portion of the front side. The glue board is adapted to permit UV light to pass through the glue board. This can be achieved by making the glue board out of UV transparent or UV translucent materials, or perforating the glue board if the substrate is made of a material otherwise opaque to UV light.

The housing is adapted to hold the electronic circuit and the glue board so that the front side of the glue board coated with the adhesive faces away from the electronic circuit and the light-emitting diodes emit UV light through the glue board. The housing also has a front panel including openings defined by closed sections having edges. The openings permit flying insects to enter the trap through such openings. The openings also permit the adhesive layer of the glue board to be viewed through such openings by flying insects. The closed sections are adapted to cause at least some of the light from the light-emitting diodes reaching the closed sections to bounce off the closed sections and on to the adhesive layer coating a portion of the front surface of the glue board. The closed sections also serve to at least partially mask from the view of humans standing or sitting in the room insects stuck to the glue board.

When a trap having the above-described features is in use and the adhesive layer of the glue board is viewed by flying insects through the openings in the front panel of the housing, a pattern is presented on the glue board comprising bright direct UV light from the light-emitting diodes, dimmer bounced UV light and shadows.

The various components described above may include other features. The electronic circuit may be adapted to be powered by household current. The electronic circuit may be coupled to prongs projecting directly from a flat surface on the back of the housing and adapted to be plugged into a standard electrical socket such that the prongs not only supply power to the circuit, but also physically support the insect trap. Alternatively, a battery may power the electrical circuit and an alternative mounting means may be employed to hang the trap on a wall, ceiling or other stable structure.

Also, the light-emitting diodes of the circuit may be arranged in a pattern. That pattern may comprise at least two rows of light-emitting diodes. When the glue board has perforations, those perforations may be arranged in the same pattern as the pattern of the light-emitting diodes. The light-emitting diodes may also be adapted to emit light in both the ultraviolet and visible light ranges. The electrical circuit comprising the light-emitting diodes may also be designed to cause the light-emitting diodes to selectively dim and brighten or cycle on and off to increase insect attraction.

The glue board may be UV transparent or UV translucent. Alternatively, the glue board may be generally UV opaque, but have perforations which enable UV light to pass through the glue board. If generally UV opaque with perforations, the glue board may be colored black to partially mask from the human eye any insects stuck to the glue board. Otherwise, humans could see the insects due to the presence of ambient light even though humans cannot see the UV light generated by the light-emitting diodes. The adhesive may be selected to provide a glossy surface to increase insect attraction or to provide a matte surface to better hide the captured insects from the view of humans. The substrate or adhesive may be smooth to cause the UV light to bounce off the glue board in a specular manner, or may be textured to cause the UV light to bounce off the glue board in a more diffuse manner.

The housing may have an opening that permits the glue board to be quickly and easily removed and replaced without removing any portion of the housing. Also, the edges of the openings in the front of the housing may be adapted to be illuminated by the light-emitting diodes to essentially frame the openings with insect attractant light.

BRIEF DESCRIPTION OF THE DRAWINGS

The features and attributes which may be employed to practice the present invention will be better understood from a review of the detailed description provided below in conjunction with the accompanying drawings.

FIG. 4 is a perspective view of the trap of FIG. 1 with the glue board partially removed from the housing;

FIG. 5 is a perspective view of the trap of FIG. 1 with the glue board entirely removed from the housing;

FIG. 6; is a schematic view of one example of a circuit that may be used to generate insect attracting light; and FIG. 7 is a cross-sectional view of the glue board of the insect trap of FIG. 1.

DETAILED DESCRIPTION

Figure 1:
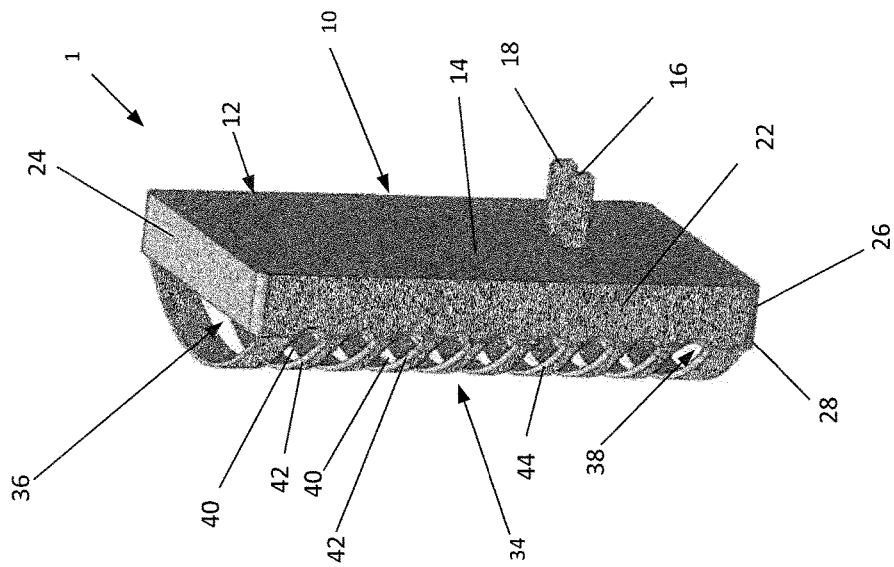
FIG. 1 is a perspective view showing the front of a flying insect trap.
Figure 2:
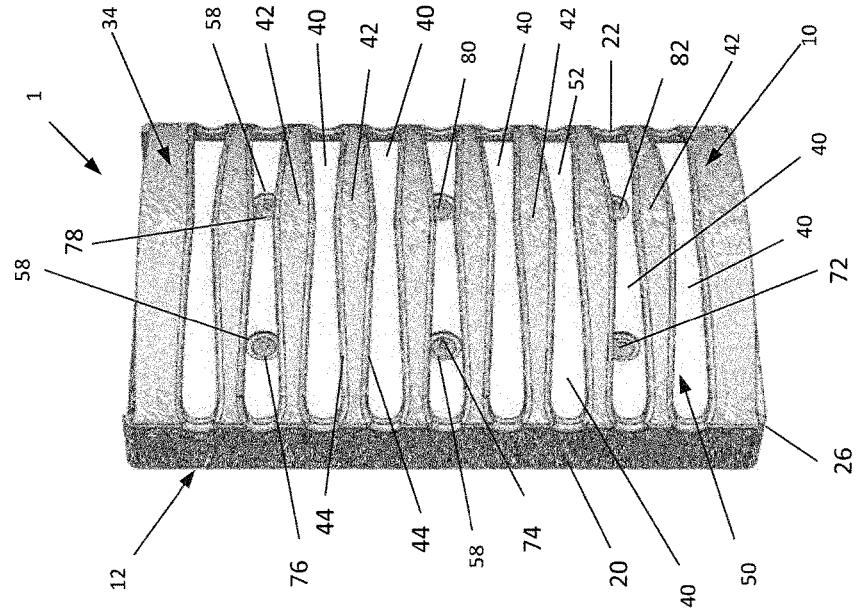
FIG. 2 is a perspective view showing the back of the trap of FIG. 1.
Figure 3:
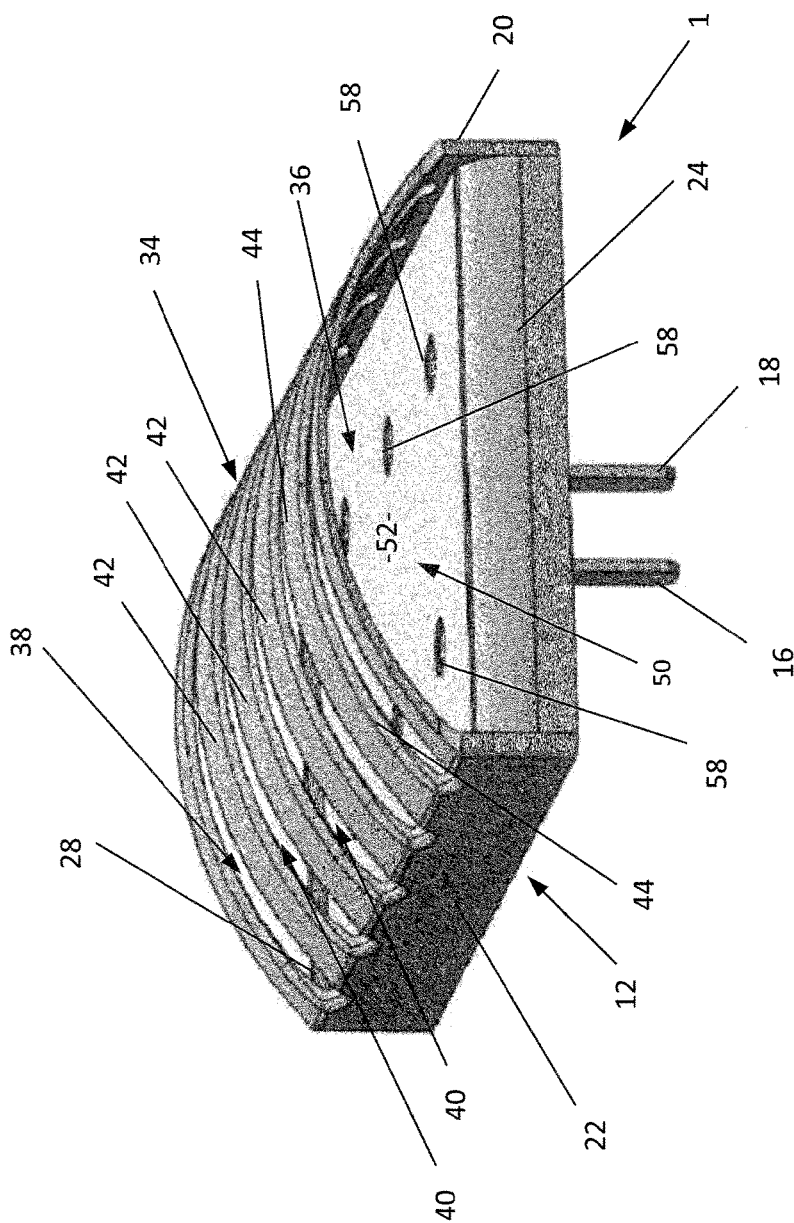
FIG. 3 is a perspective view showing the top of the trap of FIG. 1.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

The flying insect trap 1 shown in the drawings comprises a housing 10, a glue board 50, and an electronic circuit 70. These elements combine to provide a unique display of insect attractant light directly on the front side 52 of the glue board 50. An adhesive coating 54 on the front side 52 of the glue board 50 captures any insects coming into contact with the front side 52 of the glue board 50.

The housing 10 shown in the drawings has a back compartment 12 in which electronic circuit 70 is stored. The back compartment 12 comprises a back wall 14. The back wall 14 has a flat surface and two electrical prongs 16 and 18 project from this flat surface. While the drawings show the entire back wall 14 to be flat, this is not necessary. For example, the portion of the back wall 14 surrounding the prongs 16 and 18 could be a generally flat surface with other portions of the wall being at an angle from, parallel to, or even having a contour other than the flat surface. The prongs 16 and 18 provide two functions when plugged into a standard electrical outlet (not shown) supplying household current. First, the prongs 16 and 18 supply electrical energy to the electronic circuit 70. Second, the prongs 16 and 18 support the entire insect traps 1.

The back compartment 12 has two side walls 20 and 22, a top wall 24, and a bottom wall 26. The bottom wall includes an extension 28 that prevents the glue board 50 from falling out the bottom of the housing 10. As shown in FIGS. 4 and 5, the back compartment 12 also includes a front wall 30. As shown, the front wall has six round openings 32. Light-emitting diodes 72-82 are visible through the openings 32. The shape and number of these openings may vary without deviating from the invention.

In addition to the back compartment 12, the housing 10 has a front panel 34. The front panel 34 may be integrally formed with, permanently adhered to, or temporarily fastened to the back compartment 12. As shown in the drawings, the front panel 34 is coupled at its opposite edges to the two side walls 20 and 22 of compartment 12 and bows outwardly from the two side walls 20 and 22. This provides a large top opening 36 through which glue board 50 can be inserted, removed and replaced. While there is a similar opening 38 at the bottom, the extension 28 of the bottom wall 26 of back compartment 12 reduces the size of the bottom opening 38 preventing the glue board from dropping out the bottom of the trap 1 when the trap 1 is plugged into an electrical outlet.

The front panel 34 also includes a plurality of openings 40 defined by closed sections 42 having edges 44. The openings 40 and closed sections 42 are each generally elongate extending from side wall 20 to side wall 22. The openings 40 permit insects to enter and light to exit the trap. The openings 40 also permit the flying insect to view the insect attractant light display described below that is presented on the glue board 50. The closed sections 42 interfere with the ability of people to readily view any insects trapped on the glue board 50, prevent young children from touching the glue board 50 and the insects adhered to the adhesive layer 54 of glue board 50, and also help provide a display of light on the front surface 52 of glue board 50 that is highly attractive to flying insects.

Glue board 50 comprises a substrate 51 and has a front side 52 and a back side 53, An adhesive layer 54 on the front side 52 coats a selected portion of the substrate 51. As shown in FIG. 6, the edges 56 of the substrate 51 are left uncoated so a user need not touch the adhesive layer 54 when replacing the glue board 50. The features of the glue board 50 discussed above are common to many glue boards offered by pest control device manufacturers. However, glue board 50 has distinguishing features. As shown in the drawings, the glue board 50 is adapted to permit UV light to pass through the glue board 50. This is achieved either by making the substrate of a UV light transmissive material (i.e., a UV transparent or a UV translucent material) or, as shown, by including a plurality of perforation 58 extending through at least the substrate 51.

Examples of such UV light transmissive materials include fused silica, calcium fluoride, magnesium fluoride and various acrylic sheets such as Acrylite Op-4 sold by GYRO Industries of Parsippany, N.J. These materials tend to be relatively expensive, so the less expensive option of perforating the substrates typically employed to construct glue boards may be preferred in certain situations. The number, position and shape of the perforations 58 correspond to the openings 32 in the front wall 30 of back compartment 12. When the glue board 50 is positioned in the housing 10, each perforation 58 is aligned with one of the openings 32 to provide pathways for UV light to exit the back compartment 12 and pass through the glue board 50.

The UV light referenced above is generated by electronic circuit 70. As shown in FIG. 6, the circuit 70 comprises six separate light-emitting diodes 72-82. The circuit further includes resistors 84, 86 and 88, capacitors 90 and 92 and a full waive rectifier bridge 94. Bridge 94 converts to direct current the 120 v alternating current supplied to the prongs 16 and 18 by the electrical outlet (not shown). The various resistors and capacitors control the delivery of electrical energy to the light-emitting diodes 72-82.

The electrical circuit 70 is adapted to fit in the back compartment 12 of the housing 10 so that the light-emitting diodes 72-82 are aligned with the openings 32 through the front wall 30 of back compartment 12. As such, light emitted by the light-emitting diodes can pass through openings 32, the perforations 58 of the glue board 50 when the glue board 50 is positioned in housing 10, and through openings 40 in the front panel 34 of housing 10. The light-emitting diodes 72-82 are of a type that generate peak output in the UV light range which is most attractive to flying insects. The circuit 70 may also be adapted to selectively dim and brighten the light-emitting diodes 72-82 (or to cycle them on and off) in a controlled sequence to increase insect attraction. The circuit may also be adapted to be powered by a battery supplying DC current.

The combination of elements described above is highly advantageous because it presents a light pattern on the front surface 52 of the glue board 50 that is highly attractive to flying insects. That pattern includes areas of bright direct UV light from the light-emitting diodes 72-82 that passes through openings 40 in the front panel 34, perforations 58 through the glue board 50 and openings 32 in the front wall 30 of the housing 10. That pattern also includes areas of dimmer UV light which travels from the light-emitting diodes 72-82 to the closed sections 42 of the front panel and bounces off the front panel back to the front surface 52 of the glue board 10. That pattern also includes areas of shadow on the front surface 52 of the glue board 50 where no or minimal direct or bounced UV light reaches the front of the glue board 50.

As noted above, the closed sections 42 of the front panel 34 have edges 44. The edges 44 are also illuminated by the light-emitting diodes 72-82 which is believed to aid in insect attractancy. The edges 44 frame the openings 40.

Further, the adhesive layer 54 on the front surface 52 of glue board 50 may be modified in various ways to enhance insect attractancy. The adhesive layer can be light transmissive in the UV range so that light from the light-emitting diodes 72-82 can travel through this layer. This is particularly important if the adhesive layer covers the perforations 58 or if the substrate 51 is made of a UV transparent or UV translucent material. The adhesive layer 54 can be made to diffuse the UV light or to cause the UV light to bounce off the front surface of the glue board 50 in a specular manner. Either of these effects can be achieved by modifying the chemistry of the adhesive material used or the physical nature of the adhesive surface. A rough surface will tend to diffuse the UV light. A smooth surface will act like a mirror.

Still further, the glue board 50 (or either the substrate or adhesive layer) may be stamped or otherwise textured with a preselected pattern of depressions and ridges that cause brighter and dimmer areas of UV light on the front surface 52 of the glue board 50. These ridges and depressions may also be arranged to provide either sharp or blurred lines of demarcation between areas of shadow and light.

Likewise, the light-emitting diodes may be randomly arranged or arranged in any suitable pattern for achieving insect attraction. The pattern may, for example, include two rows of light-emitting diodes, as illustrated. The pattern of holes 32 in the front wall 30 of the back compartment 12 and the pattern of the perforations 58 in the glue board should match the selected pattern of the light-emitting diodes 72-82. Likewise, the number, size, shape and arrangement of light-emitting diodes (and openings) should be adapted to that UV light is still present even if one of the perforations is blocked by the body of a captured insect.

Various advantages arise from the trap described above. First, the light-emitting diodes 72-82 generate intense UV light without requiring much in the way of electrical power. Second, the glue board 50 is easily replaced. Third, the openings 40 in the front panel 34 are large enough to permit flying insects to see the insect attractive UV light display on the front surface of the glue board, yet small enough such that the closed sections 42 effectively prevent children from reaching into the trap. Likewise, the closed sections 42 generally block from human view any insects stuck to the adhesive surface of the glue board 50. This is particularly true when the user is at a standing or seated position because of the height at which electrical outlets are typically mounted.

In the embodiment described above, the insect attractant light pattern is on the glue board itself. Thus, insects attracted by the pattern are more likely to come into contact with the adhesive surface of glue board 50 than if the pattern is some distance from the glue board as is the case with prior art insect traps employing a glue board.

The foregoing description is intended to explain the various features and advantages, but is not intended to be limiting. The scope of the invention is defined by the following claims which are also intended to cover a reasonable range of equivalents.

What is claimed is:

1. An insect trap comprising:
 a) a housing having a back compartment and a front panel, said back compartment having a front wall extending along a first plane and including a plurality of apertures arranged in a pattern extending through the front wall, said front panel including openings defined by closed sections having edges;
 b) an electronic circuit enclosed within the back compartment of the housing, said electronic circuit including a plurality of light-emitting diodes arranged in a pattern matching the pattern of the apertures in the front wall of the back compartment of the housing so that each of said plurality of light-emitting diodes is aligned with a different one of said plurality of apertures extending through the front wall, each of said light-emitting diodes adapted to emit light in the ultraviolet (UV) range of the light spectrum, wherein the electronic circuit is adapted to selectively control an output of each of the light-emitting diodes in a controlled sequence;
 c) an adhesive layer extending along a second plane parallel to the first plane, wherein the adhesive a layer is adapted to permit the light emitted by the light-emitting diodes to pass directly through the adhesive layer via a plurality of spaced apart perforations extending through the adhesive layer, and wherein each of the light-emitting diodes of the electronic circuit are aligned with and visible through different perforations of said plurality of spaced apart perforations of the adhesive layer; and wherein some of the light emitted from the light-emitted diodes pass through the openings in the front wall of the housing and through the adhesive layer, strikes the closed sections of the front panel and is reflected off the closed sections of the front panel back on to the adhesive layer so that when the adhesive layer is viewed through the openings of the front panel, a pattern is presented comprising bright direct ultraviolet direct light from the light-emitting diodes, dimmer reflected ultraviolet light, and shadows.

2. The insect trap of claim 1 wherein the front wall of the back compartment is a substrate of a glue board and at least some of the ultraviolet light passes through the glue board by way of the plurality of spaced apart apertures extending through the glue board and adapted to permit said light to pass through the glue board.

3. The insect trap of claim 2 wherein the housing has at least one opening through which the glue board can be removed and replaced without removing any part of the housing.

4. The insect trap of claim 2 wherein the substrate is made of a material at least partially transmissive to ultraviolet light.

5. The insect trap of claim 2 wherein the adhesive layer coats at least a portion of the substrate and provides a glossy finish to said portion of the substrate.

6. The insect trap of claim 3 wherein the housing has a flat surface with electrical prongs projecting therefrom, said prongs adapted to mate with an electrical socket to power the electronic circuit and support the insect trap.

7. The insect trap of claim 1 wherein at least some portion of the ultraviolet light emitted by the light-emitting diodes illuminates the edges of the closed sections.

8. The insect trap of claim 1 wherein the adhesive layer diffuses some of the light reaching the adhesive layer.

9. The insect trap of claim 1 wherein the pattern comprises at least two rows.

10. The insect trap of claim 1 wherein said light-emitting diodes emit light in both the ultraviolet and visible portions of the light spectrum.

11. The insect trap of claim 1 wherein the openings are elongated.

12. An insect trap comprising:
a) an electronic circuit including a plurality of spaced apart light-emitting diodes adapted to emit light in the ultraviolet range of the light spectrum, wherein the electronic circuit is adapted to selectively a control an output of each of the light-emitting diodes in a controlled sequence;
b) a glue board including a substrate having a front side and back side, and an adhesive layer coating a selected portion of the front side, wherein the glue board is adapted to permit light to pass through the glue board via a plurality of spaced apart perforations extending through at least the substrate of the glue board; and
c) a housing adapted to hold the electronic circuit and the glue board so that the front side of the glue board faces away from the electronic circuit and each of the light-emitting diodes of the electronic circuit are aligned with and visible through different perforations of said plurality of spaced apart perforations of the glue board, said housing having a front panel including openings defined by closed sections having edges, said openings adapted to permit flying insects to enter the trap through such openings and to permit the adhesive layer of the glue board to be viewed through such openings, wherein at least some of the light from the light-emitting diodes passes directly through the glue board, reaches the closed sections, and bounces off the closed sections back on to the adhesive layer of the glue board, wherein a pattern comprising bright direct light from the light-emitting diodes and dimmer bounced light, and shadows is present on the front side of the glue board.

13. The insect trap of claim 12 wherein the front side of the glue board is black.

14. The insect trap of claim 13 wherein the adhesive layer provides a glossy finish to the front side of the glue board.

15. The insect trap of claim 12 wherein said plurality of spaced apart light-emitting diodes are arranged in a pattern, and said plurality of spaced apart perforations are arranged in the same pattern as the plurality of spaced apart light-emitting diodes.

16. The insect trap of claim 12 wherein the housing has a flat surface with electrical prongs projecting therefrom, said prongs adapted to mate with an electrical socket to power the electronic circuit and support the insect trap.

* * * * *